US012686064B2

(12) United States Patent (10) Patent No.: US 12,686,064 B2
Zettler et al. (45) Date of Patent: Jul. 21, 2026

(54) INSERT HOLDER HAVING WEIGHT-REDUCING VOIDS AND CUTTING TOOL

(71) Applicant: ISCAR, LTD., Tefen (IL)

(72) Inventors: Martin Ulrich Zettler, Vaihingen-Horrheim (DE); Nikolaos Poussios, Vaihingen-Horrheim (DE); Henner Michael Dziubas, Vaihingen-Horrheim (DE)

(73) Assignee: ISCAR, LTD., Tefen (IL)

( * ) Notice: Subject to any disclaimer, the term of this patent is extended or adjusted under 35 U.S.C. 154(b) by 502 days.

(21) Appl. No.: 17/550,531

(22) Filed: Dec. 14, 2021

(65) Prior Publication Data

US 2023/0182212 A1 Jun. 15, 2023

(51) Int. Cl.
B23B 51/02 (2006.01)
B23B 51/00 (2006.01)
B23B 51/06 (2006.01)

(52) U.S. Cl.
CPC ........ B23B 51/0003 (2022.01); B23B 51/068 (2022.01); B23B 2250/122 (2022.01); B23B 2251/248 (2013.01); Y10T 408/907 (2015.01)

(58) Field of Classification Search
CPC . B23B 31/0208; B23B 31/0212; B23B 31/02; B23B 2251/62; B23B 2251/248; B23B 2251/249; B23B 2251/24; B23B 2251/02; B23B 2251/68; B23B 51/0003; B23B 51/06; B23B 51/068; B23B 2250/00; B23B 2250/122; B23B 2210/12; Y10T 408/907; B23C 5/28
See application file for complete search history.

(56) References Cited

U.S. PATENT DOCUMENTS

| | | | | | |
|---|---|---|---|---|---|
| 971,039 | A | * | 9/1910 | Hackett | B23B 31/005 |
| | | | | | 408/226 |
| 972,155 | A | * | 10/1910 | Brown | B23B 31/005 |
| | | | | | 408/231 |
| 1,432,580 | A | * | 10/1922 | Vauclain | B23C 5/006 |
| | | | | | 144/237 |

(Continued)

FOREIGN PATENT DOCUMENTS

| | | | | |
|---|---|---|---|---|
| CN | 108188460 | A | * | 6/2018 |
| CZ | 33886 | U1 | * | 3/2020 |

(Continued)

OTHER PUBLICATIONS

International Search Report dated Feb. 24, 2023, issued in PCT counterpart application No. PCT/IL2022/051221.

(Continued)

*Primary Examiner* — Ryan Rufo
(74) *Attorney, Agent, or Firm* — Womble Bond Dickison (US) LLP

(57) ABSTRACT

An insert holder includes a cutting portion and a shank portion. The insert holder further includes a cavity which includes a cavity chamber and a plurality of cavity through recesses which serve to reduce the weight of the insert holder. The plurality of cavity through recesses open out to the cavity chamber and to the periphery of the shank portion. A cutting tool is provided having a cutting insert releasably attached to the insert holder.

32 Claims, 6 Drawing Sheets

(56)                References Cited

U.S. PATENT DOCUMENTS

| | | | | |
|---|---|---|---|---|
| 2,811,875 | A * | 11/1957 | Cogsdill | B23B 51/06 |
| | | | | 408/59 |
| 3,313,186 | A * | 4/1967 | Rochon | B23Q 1/0036 |
| | | | | 29/241 |
| 3,364,800 | A * | 1/1968 | Benjamin | B23Q 1/0036 |
| | | | | 408/239 R |
| 3,994,615 | A * | 11/1976 | Narang | B23B 31/0261 |
| | | | | 408/233 |
| 4,606,248 | A * | 8/1986 | Shikata | B23B 27/145 |
| | | | | 76/101.1 |
| 5,098,293 | A * | 3/1992 | Loof | A61C 3/02 |
| | | | | 433/165 |
| 5,605,420 | A * | 2/1997 | Feldsine | B23C 5/006 |
| | | | | 407/34 |
| 5,873,682 | A * | 2/1999 | Tripsa | B23B 31/1075 |
| | | | | 407/89 |
| 6,109,152 | A | 8/2000 | Hecht | |
| 6,109,841 | A | 8/2000 | Johne | |
| 6,341,926 | B1 * | 1/2002 | Liu | B23G 5/064 |
| | | | | 408/222 |
| 6,503,027 | B2 * | 1/2003 | Men | B23C 5/10 |
| | | | | 407/46 |
| 6,935,816 | B2 * | 8/2005 | Lee | B23B 29/03407 |
| | | | | 82/158 |
| 7,226,254 | B2 | 6/2007 | Friedrichs | |
| 7,374,374 | B2 | 5/2008 | Berglow | |
| 7,938,048 | B2 * | 5/2011 | Nystrom | B23B 51/06 |
| | | | | 407/11 |
| 8,950,985 | B2 * | 2/2015 | Durand-Terrasson | |
| | | | | B23B 29/02 |
| | | | | 408/227 |
| 9,434,009 | B2 * | 9/2016 | Kakimoto | B23B 51/009 |
| 9,764,398 | B2 | 9/2017 | Tanaka et al. | |
| 9,795,457 | B2 * | 10/2017 | Friedrichs | B23B 51/06 |
| 9,895,751 | B2 * | 2/2018 | Ach | B23B 51/02 |
| 10,335,980 | B2 * | 7/2019 | Miyanaga | B28D 7/02 |
| 10,543,538 | B2 * | 1/2020 | Frota de Souza | B23B 31/305 |
| 10,799,960 | B2 | 10/2020 | Zetek et al. | |
| 10,940,551 | B1 * | 3/2021 | Semnisky | B23C 5/006 |
| 10,967,448 | B2 | 4/2021 | Haenle | |
| 10,967,449 | B2 | 4/2021 | Haenle et al. | |
| 11,484,954 | B2 | 11/2022 | Stark | |
| 11,491,562 | B2 * | 11/2022 | Ishi | B23D 77/006 |
| 11,883,894 | B2 * | 1/2024 | Bookheimer | B23D 77/02 |
| 2004/0052595 | A1 * | 3/2004 | Dembicks | B23B 51/02 |
| | | | | 408/226 |
| 2011/0305534 | A1 | 12/2011 | Park et al. | |
| 2012/0082518 | A1 * | 4/2012 | Woodruff | B23P 15/34 |
| | | | | 76/115 |
| 2012/0275875 | A1 * | 11/2012 | Gischus | B23G 5/064 |
| | | | | 407/30 |
| 2016/0144437 | A1 * | 5/2016 | Ach | B23B 51/06 |
| | | | | 408/199 |
| 2016/0332236 | A1 * | 11/2016 | Stoyanov | B22F 3/15 |
| 2019/0001421 | A1 * | 1/2019 | Herud | B23B 51/08 |
| 2020/0001377 | A1 * | 1/2020 | Huang | B23B 51/108 |
| 2021/0053128 | A1 * | 2/2021 | Filho | B23B 51/02 |
| 2021/0060665 | A1 | 3/2021 | Semnisky et al. | |
| 2021/0220956 | A1 * | 7/2021 | Fang | B23C 5/28 |
| 2022/0111450 | A1 * | 4/2022 | Sato | B23C 5/282 |
| 2024/0075540 | A1 * | 3/2024 | Ellsworth | F28D 15/0233 |

FOREIGN PATENT DOCUMENTS

| | | | | |
|---|---|---|---|---|
| DE | 29521690 | | 3/1998 | |
| DE | 202009002995 | U1 * | 6/2009 | B23B 51/06 |
| DE | 10 2014208130 | | 11/2015 | |
| DE | 102018128882 | A1 * | 5/2019 | B23B 31/315 |
| DE | 102020124566 | A1 * | 3/2022 | |
| FR | 548585 | A * | 1/1923 | |
| FR | 1098149 | A * | 7/1955 | |
| GB | 191515608 | A * | 7/1916 | |
| GB | 810543 | A * | 3/1959 | |
| GB | 1274650 | A * | 5/1972 | |
| KR | 20090095373 | A * | 9/2009 | |
| KR | 20130017970 | A * | 2/2013 | |
| RU | 2 621 544 | C2 | 6/2017 | |
| RU | 2 735 701 | C1 | 11/2020 | |

OTHER PUBLICATIONS

Written Opinion dated Feb. 24, 2023, issued in PCT counterpart application No. PCT/IL2022/051221.
Office Action issued Apr. 29, 2026 in Russian Application No. 2024119136.

\* cited by examiner

1

INSERT HOLDER HAVING WEIGHT-REDUCING VOIDS AND CUTTING TOOL

FIELD OF THE INVENTION

The subject matter of the present application relates to insert holders, in general, and to such insert holders which also have a cavity in order to reduce the weight of the insert holder, in particular.

BACKGROUND OF THE INVENTION

As is known in the field of metal cutting, cutting tools can be provided with a cavity in order to reduce the weight of the cutting tool. An example of such a cutting tool is disclosed in, for example, U.S. Pat. No. 7,226,254, disclosing a rod-shaped tool of sintered material for machining a workpiece having a closed center recess designed to achieve a saving of material and weight. Another example is U.S. Pat. No. 7,374,374, showing a tool comprising a central channel configured to diminish the mass of cemented carbide in the tool.

It is an object of the subject matter of the present application to provide an insert holder having reduced weight while maintaining effective insert holder rigidity.

SUMMARY OF THE INVENTION

In accordance with a first aspect of the subject matter of the present application there is provided an insert holder, elongated along a holder longitudinal axis thereof, the holder longitudinal axis defining opposite forward and rearward directions, the insert holder being integrally formed to have unitary one-piece construction and comprising:

a holder forward end surface, a holder rearward end surface and a holder peripheral surface extending therebetween, the holder peripheral surface extending about the holder longitudinal axis;

a cutting portion comprising an insert pocket, for releasably retaining a cutting insert, the cutting portion located at a forward end of the insert holder;

a shank portion extending rearwardly from the cutting portion, the holder peripheral surface at the shank portion comprising a shank radial centering surface; and a weight-reducing cavity comprising:

a cavity chamber enclosed within the insert holder, the cavity chamber comprising a chamber interior wall surface; and a plurality of cavity through recesses opening out to: (i) the chamber interior wall surface thereby forming a plurality of inner recess openings, and to (ii) the shank radial centering surface thereby forming a plurality of outer recess opening.

In accordance with a second aspect of the subject matter of the present application there is provided a cutting tool comprising:

the insert holder of the type described above; and a cutting insert, having at least one cutting edge, releasably retained in the insert pocket.

In accordance with a third aspect of the subject matter of the present application there is provided an insert holder, elongated along a holder longitudinal axis thereof, the holder longitudinal axis defining opposite forward and rearward directions, the insert holder being integrally formed to have unitary one-piece construction and comprising:

a holder forward end surface, a holder rearward end surface and a holder peripheral surface extending therebetween, the holder peripheral surface extending about the holder longitudinal axis;

a cutting portion comprising an insert pocket, for releasably retaining a cutting insert, the cutting portion located at a forward end of the insert holder;

a hollow shank portion extending rearwardly from the cutting portion, the hollow shank portion comprising:

a shank radial centering surface which is part of the holder peripheral surface;

a shank flat surface which also is part of the holder peripheral surface, and is oriented parallel to the holder longitudinal axis and intersects the shank radial centering surface; and a plurality of cavity through recesses connecting an interior wall surface of the hollow shank portion to the shank radial centering surface.

It is understood that the above-said is a summary, and that features described hereinafter may be applicable in any combination to the subject matter of the present application, for example, any of the following features may be applicable to the cutting tool or insert holder:

The cavity chamber can be enclosed only in the shank portion.

The cavity chamber can be spaced apart from the holder rearward surface.

Each cavity through recess can comprise a recess interior wall surface extending about a recess central axis, two opposite through recess ends located between a respective the inner recess opening and a respective outer recess opening along the recess interior wall surface and an elongated through recess middle portion extending lengthwise between the two opposite through recess ends, so that each cavity through recess can be elongated in a direction along the holder longitudinal axis.

For any given one of the plurality of cavity through recesses, one of the two through recess ends can be closer to the cutting portion than the other one of the two through recess ends.

The shank radial centering surface can be cylindrical or conical about the holder longitudinal axis.

The shank radial centering surface can be cylindrical about the holder longitudinal axis. The cylindrical shank radial centering surface can have a shank diameter.

The chamber interior wall surface can comprise two opposite chamber end surfaces and a chamber peripheral surface extending between the chamber end surfaces, about a chamber central axis. The chamber peripheral surface can be cylindrical about the chamber central axis, the cylindrical chamber peripheral surface having a chamber diameter. The chamber diameter can be greater than a quarter the shank diameter and less than three quarters the shank diameter.

The chamber diameter can be equal to half the shank diameter.

The plurality of cavity through recesses can comprise N cavity through recesses (66), N being a positive integer satisfying the condition, $5 \leq N \leq 9$.

N can be equal to 7.

The plurality of cavity through recesses can be angularly spaced apart about the holder longitudinal axis.

The plurality of cavity through recesses can be angularly spaced by a plurality of shank support members, each circumferentially adjacent pair of cavity through recesses being spaced apart by a respective shank support member.

The shank radial centering surface at each shank support member can be wider than each outer recess opening in a circumferential direction.

In a cross-section taken in a radial plane perpendicular to the holder longitudinal axis and intersecting the plurality of shank support members, each of the plurality of shank support members can have an annular sector basic shape.

The holder peripheral surface at the shank portion can comprise a shank flat surface which is oriented parallel to the holder longitudinal axis and intersects the shank radial centering surface.

The shank flat surface can intersect a projected path of at least one of the plurality of cavity through recesses, so that the plurality of cavity through recesses comprises at least one truncated cavity through recess.

For each cavity through recess that is not a truncated cavity through recess, one of the two through recess ends can be closer to the cutting portion than to the holder rearward end surface and the other one of the two through recess ends can be closer to the holder rearward end surface than to the cutting portion.

The insert holder can comprise a flat support member, the flat support member being angularly located between two cavity through recesses and incorporates a portion of the shank flat surface.

The plurality of cavity through recesses can comprise a plurality of truncated cavity through recess. The flat support member can be located between two truncated cavity through recess.

The insert holder can comprise a cooling conduit, the cooling conduit comprising a plurality of cooling channels, each cooling channel having a channel inlet and a channel outlet which are in fluid communication with each other. Each cooling channel can pass through a respective shank support member.

The cooling conduit can comprise a cooling reservoir comprising a reservoir interior wall surface, the cooling reservoir being enclosed in the insert holder forward of the cavity chamber. Each channel outlet can be located at the reservoir interior wall surface.

The plurality of cavity through recesses can extend helically about the holder longitudinal axis.

The cutting portion can comprise a plurality of flutes recessed in the holder peripheral surface and extending helically about the holder longitudinal axis in the same sense as the plurality of helically-extending cavity through recesses.

Each helically-extending cavity through recess can have a recess helix angle, the recess helix angle being greater than or equal to 20° and less than or equal to 40°.

The holder peripheral surface can comprise a holder intermediate surface oriented transversely to the holder longitudinal axis. The holder intermediate surface can be contained in a delimiting plane which is oriented perpendicular to the holder longitudinal axis and delimits the cutting portion and the shank portion.

The cutting portion has a cutting portion length and the shank portion has a shank portion length, both measured in a direction of the holder longitudinal axis; and the shank portion length can be greater than the cutting portion length.

The cavity chamber has a cavity chamber length, measured in a direction of the holder longitudinal axis. The cavity chamber length can be greater than half the shank portion length.

The chamber interior wall surface can comprise two opposite chamber end surfaces and a chamber peripheral surface extending therebetween about a chamber central axis. The chamber peripheral surface can be cylindrical about the chamber central axis, the cylindrical chamber peripheral surface having a chamber diameter.

The plurality of inner recess openings can be located at the cylindrical chamber peripheral surface.

In a cross-section taken in a radial plane perpendicular to the holder longitudinal axis and intersecting the plurality of cavity through recesses, each cavity through recess can extend linearly along a recess central axis.

The cavity chamber has a cavity chamber length. Along the cavity chamber length of the cavity chamber, the plurality of cavity through recesses can take up between 10%-40% of the surface area of the shank radial centering surface.

The cutting tool can be a rotary cutting tool rotatable about the holder longitudinal axis.

The plurality of cavity through recesses can be elongated in a direction along the holder longitudinal axis and extend helically thereabout. In a circumferential direction of the shank radial centering surface, the plurality of cavity through recesses can be separated from on another by shank support members which are also elongated in said direction along the holder longitudinal axis and extend helically thereabout.

The hollow shank portion can comprise a cavity chamber having a cavity chamber length. The plurality of cavity through recesses can connect the cavity chamber to the shank radial centering surface. Along the cavity chamber length of the cavity chamber, the plurality of cavity through recesses can take up between 10%-40% of the surface area of the shank radial centering surface.

BRIEF DESCRIPTION OF THE FIGURES

For a better understanding of the present application and to show how the same may be carried out in practice, reference will now be made to the accompanying drawings, in which.

Figures 1, 2:
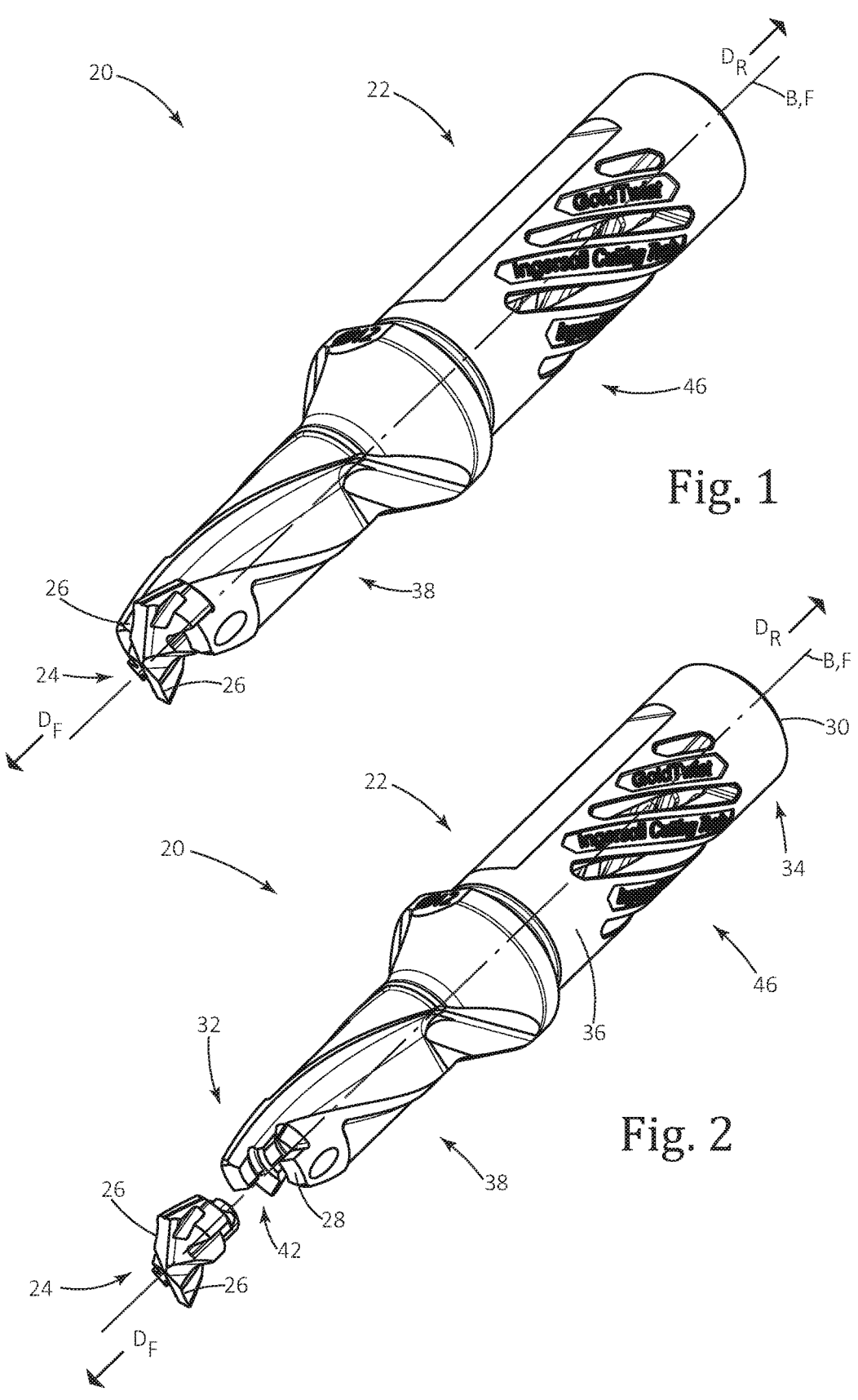
FIG. 1 is a perspective view of a cutting tool, in accordance with the present application.
FIG. 2 is an exploded view of the cutting tool in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be a rotary cutting tool. That is to say, the cutting tool 20 is designed to rotate about a rotational axis. In the non-limiting example shown in the drawings, the cutting tool 20 is a drilling tool. However, the subject matter of the present application is not restricted only to drilling tools and could also be applicable to, for example but not limited to, milling tools.

The cutting tool 20 includes an insert holder 22, which is described in detail further on in the description. The cutting tool 20 also includes a cutting insert 24. The cutting insert 24 has at least one cutting edge 26 designed to perform metal cutting operations. The cutting insert 24 is typically made from carbide. The cutting insert 24 can be releasably attached to the insert holder 22.

Reference is now made to FIG. 2, showing the insert holder 22, depicting another aspect of the present application. The insert holder 22 is typically made of steel. The insert holder 22 has a holder longitudinal axis B, that defines opposite forward and rear directions $D_F$, $D_R$. The insert holder 22 is elongated along the holder longitudinal axis B. In accordance with some embodiments of the subject matter of the present application, the cutting tool 20 and the insert holder 22 can be co-axial with each other. It should be noted that two elements (e.g., the cutting tool 20 and the insert holder 22 in the present case) are co-axial with each other when their longitudinal axes are co-incident (aligned with other).

Figures 3, 4, 5A:
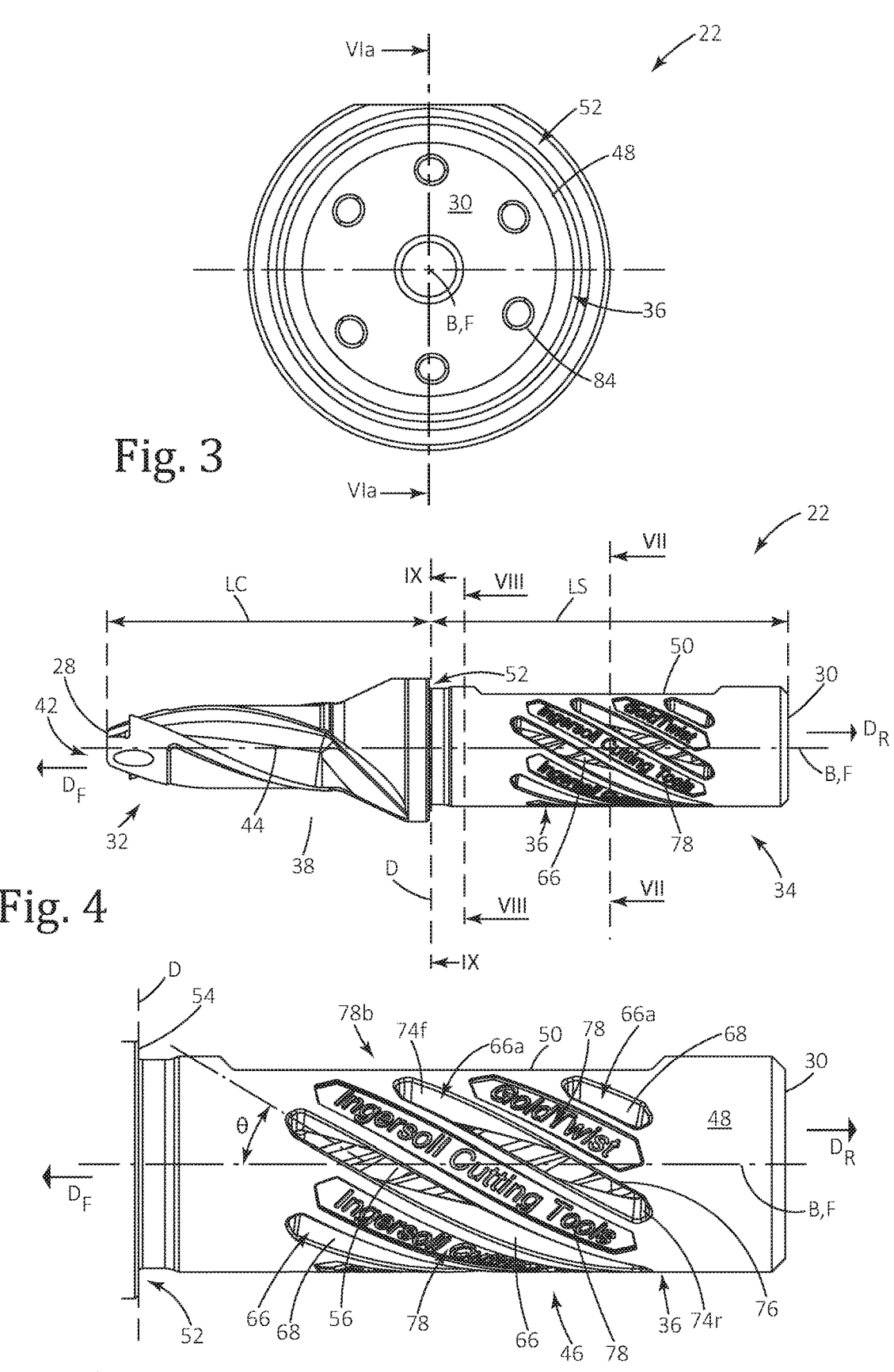
FIG. 3 is a rear end view of an insert holder in FIG. 1.
FIG. 4 is a side view of the insert holder in FIG. 3.
FIG. 5a is a detail of FIG. 4.
Figures 5B, 6A, 6B:
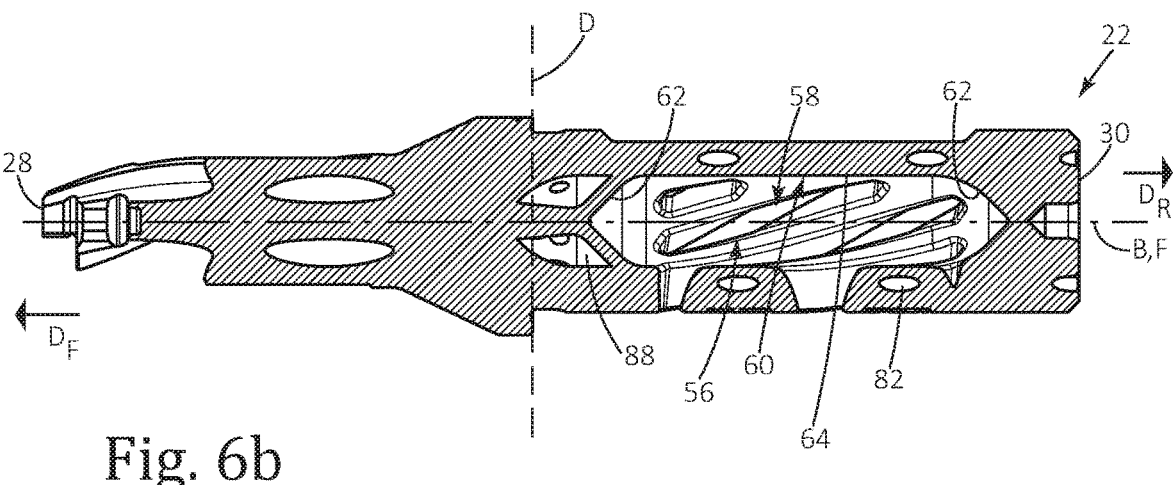
FIG. 5b is analogous to FIG. 5a, with the insert holder rotated 90° about a holder longitudinal axis.
FIG. 6a is a longitudinal cross-sectional view of the insert holder taken along line VIa-VIa in FIG. 3, showing a weight-reducing cavity.
FIG. 6b is analogous to FIG. 6a, showing a longitudinal cross-section of another weight-reducing cavity.

It should further be noted that use of the terms "forward" and "rearward" throughout the description and claims refer to a relative position in a direction of the holder longitudinal axis B to the left and to the right, respectively, in FIGS. 4 and 6a-6b. Generally speaking, the forward direction is the direction towards the cutting insert 24.

The insert holder 22 is additively manufactured. The insert holder 22 has monolithic construction, i.e., it is integrally formed to have unitary one-piece construction. As used herein, an item is said to have "unitary one-piece construction" if it results from an additive manufacturing process, even if more than one material is used during the additive manufacture of that item.

It should be noted that use of the term "additively manufactured" throughout the description and claims refers to refers to processes used to create a three-dimensional object in which layers of material are formed to create an object. Examples of such processes include, but are not limited to, Selective Laser Melting (SLM), Selective Laser Sintering (SLS), Direct Metal Laser Sintering (DMLS), Fused Deposition Modeling (FDM) and 3D Printing.

Referring to FIGS. 1 to 2, the insert holder 22 includes a holder forward end surface 28 and a holder rearward end surface 30 opposite the holder forward end surface 28. The holder forward end surface 28 is located at a forward end 32 of the insert holder 22. The holder rearward end surface 30 is located at a rearward end 34 of the insert holder 22. The holder rearward surface 30 can be planar. The holder forward and rearward surfaces 28, 30 can be intersected by the holder longitudinal axis B. The insert holder 22 further includes a holder peripheral surface 36 extending between the holder forward end surface 28 and the holder rearward end surface 30. The holder peripheral surface 36 extends about the holder longitudinal axis B.

Reverting to FIG. 2, the insert holder 22 includes cutting portion 38. The cutting portion 38 is located at the forward end 32 of the insert holder 22. The cutting portion 38 includes an insert pocket 42, for receiving the cutting insert 24. In accordance with some embodiments of the subject matter of the present application, the insert pocket 42 can be located at the intersection of the holder peripheral surface 36 and the holder forward end surface 28. In an assembled position of the cutting tool 20, the cutting insert 24 can be releasably retained in the insert pocket 42.

In accordance with some embodiments of the subject matter of the present application, the cutting portion 38 can include a plurality of flutes 44 recessed in the holder peripheral surface 36. The plurality of flutes 44 can extend helically about the holder longitudinal axis B. The cutting portion 38 has a cutting portion length LC measured in a direction of the holder longitudinal axis B.

The insert holder 22 includes a shank portion 46 which extends rearwardly from the cutting portion 38. The shank portion 46 includes a means to attach the insert holder 22 to a tool holder (not shown). Specifically, the shank portion 46 is configured to be located in a tool receiving recess of the tool holder and releasably clamped therein. The insert holder 22 has a delimiting plane D oriented perpendicular to the holder longitudinal axis B. The delimiting plane D delimits the cutting portion 38 and the shank portion 46. The shank portion 46 has a shank portion length LS measured in a direction of the holder longitudinal axis B. In accordance with some embodiments of the subject matter of the present application, the shank portion length LS can be greater than the cutting portion length LC.

Figure 7:
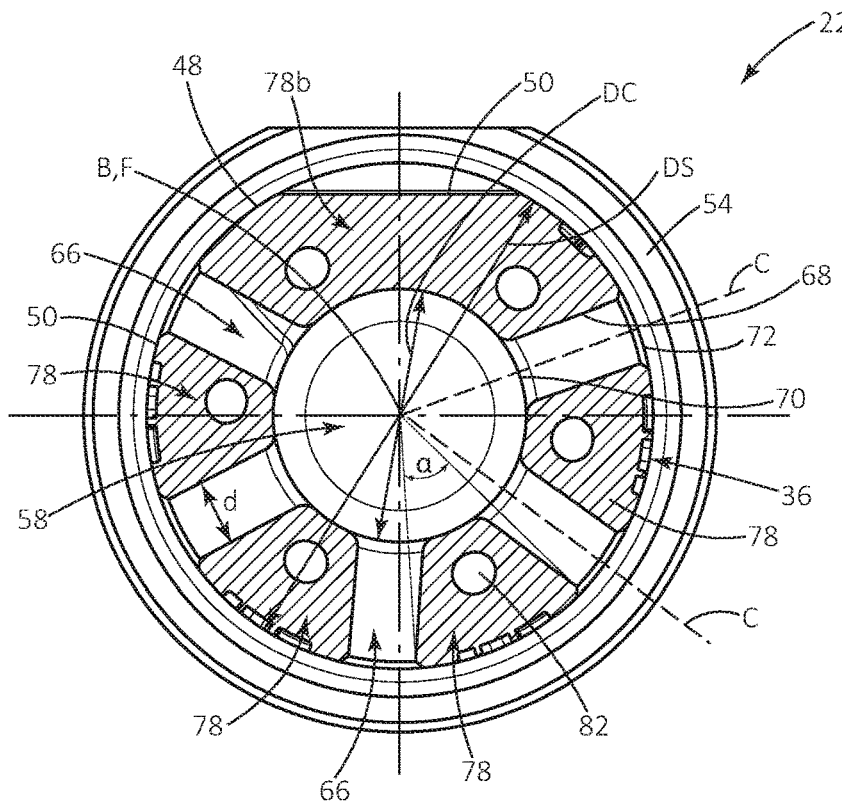
FIG. 7 is a first radial cross-sectional view of the insert holder taken along line VII-VII in FIG. 4.
Figure 8:
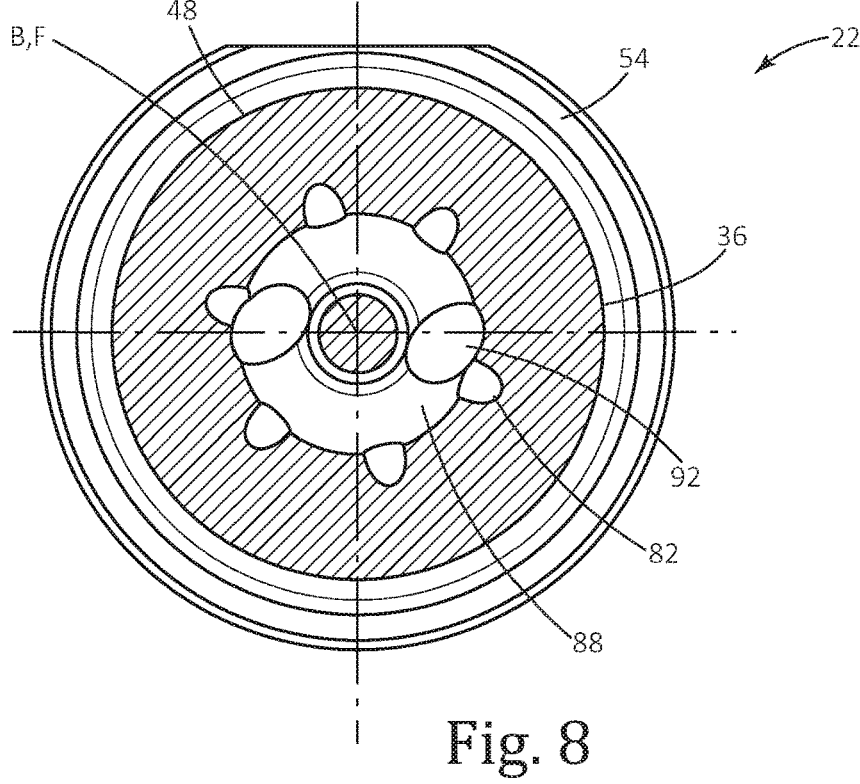
FIG. 8 is a second radial cross-sectional view of the insert holder taken along line VIII-VIII in FIG. 4.
Figures 9, 10:
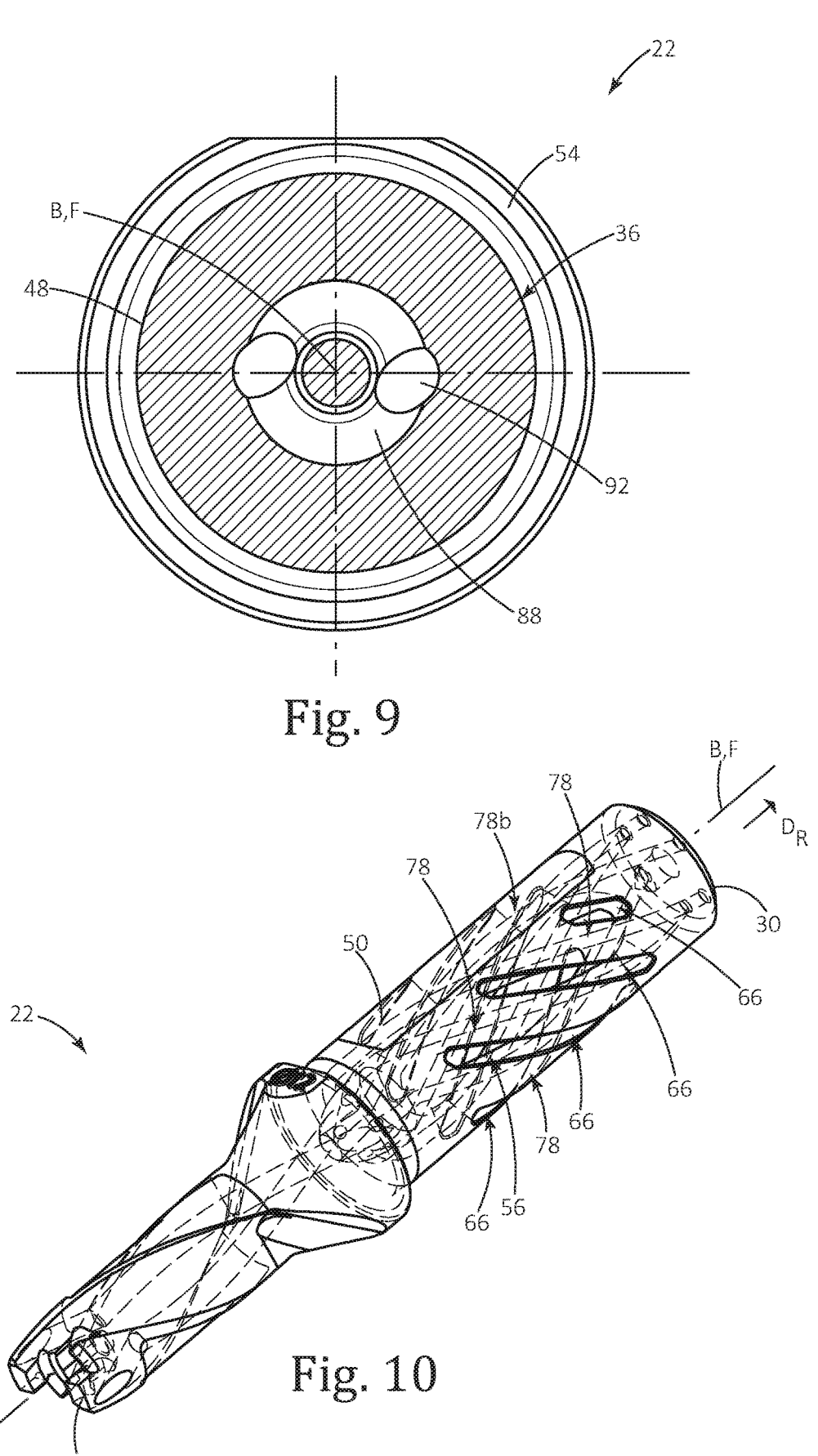
FIG. 9 is a third radial cross-sectional view of the insert holder taken along line IX-IX in FIG. 4.
FIG. 10 is a perspective view the insert holder in FIG. 1, showing a partially hidden weight-reducing cavity and a hidden cooling conduit with dashed lines.

Referring to FIGS. 4 and 5a-5b, the holder peripheral surface 36 at the shank portion 46 includes a shank radial centering surface 48. The shank portion 46 is designed be inserted into a recess in the tool holder. The shank radial centering surface 48 serves to ensure precise radial alignment of the insert holder 22 in the tool holder. In accordance with some embodiments of the subject matter of the present application, the shank radial centering surface 48 can be cylindrical or conical about the holder longitudinal axis B. Preferably, the shank radial centering surface 48 can be cylindrical about the holder longitudinal axis B. As seen in FIG. 7, the cylindrical shank radial centering surface 48 has a shank diameter DS. The shank radial centering surface 48 can extend the entire axial length of the shank portion 46 (i.e., from the holder rearward end surface 30 to the cutting portion 38).

In accordance with some embodiments of the subject matter of the present application, the holder peripheral surface 36 at the shank portion 46 can include a shank flat surface 50. The shank flat surface 50 provides a means for clamping and to transfer torque from the tool holder to the insert holder 22. The shank flat surface 50 is planar and can be oriented parallel to the holder longitudinal axis B. The shank flat surface 50 can intersect the shank radial centering surface 48. Unlike the shank radial centering surface 48, the shank flat surface 50 can be spaced apart from the holder rearward end surface 30 and the cutting portion 38. The shank flat surface 50 can be elongated in the direction of the holder longitudinal axis B. It is noted that the insert pocket 42 and the plurality of flutes 44 can be on one side of the delimiting plane D and the shank radial centering surface 48 and the shank flat surface 50 can be on the other side of the delimiting plane D.

In accordance with some embodiments of the subject matter of the present application, the holder peripheral surface 36 can include a holder intermediate surface 52 oriented transversely to the holder longitudinal axis B. The holder intermediate surface 52 can extend radially outwards from the shank portion 46 to the cutting portion 38. The holder intermediate surface 52 can extend around a full 360° angular extension of the holder longitudinal axis B. The holder intermediate surface 52 can be contained in the delimiting plane D. The holder intermediate surface 52 can include a shank axial abutment surface 54 oriented perpendicular to the holder longitudinal axis B. Specifically, the shank axial abutment surface 54 can define the delimiting plane D.

The wall of the shank portion 46 is provided with one or more weight-reducing voids 66 (referred to further below as "cavity through recesses 66") which reduce the overall weight of insert holder 22. As discussed further below, the shank portion 46 is hollow and the voids 66 connect an interior wall surface 60 of the hollow shank portion 46 to an outer surface thereof.

Referring to FIGS. 6a and 6b, the insert holder 22 includes a weight-reducing cavity 56 formed within the insert holder 22. Stated differently, the weight-reducing cavity 56 is enclosed within the insert holder 22. Thus, the insert holder 22 is hollow. The weight-reducing cavity 56 is designed to reduce the weight of the insert holder 22. As discussed further below, the reduction in weight of the weight-reducing cavity 56 is realized by providing one or more voids 66 along its length, to thereby reduce the amount of material used to form the insert holder 22.

The weight-reducing cavity 56 includes a cavity chamber 58. The cavity chamber 58 is enclosed within the insert holder 22. The cavity chamber 58 has a chamber central axis F. The cavity chamber 58 has a cavity chamber length L measured in a direction of the holder longitudinal axis B. In accordance with some embodiments of the subject matter of the present application, the cavity chamber length L can be greater than half the shank portion length LS. The chamber central axis F can be co-incident with the holder longitudinal axis B.

In accordance with some embodiments of the subject matter of the present application, the cavity chamber 58 can be enclosed fully in the shank portion 46. Stated differently, the cavity chamber 58 may be located in the shank portion 46 and may not be located in the cutting portion 38. The cavity chamber 58 can terminate before the cutting portion 38 (specifically, the delimiting plane D) in the forward direction $D_F$. It is noted that the entire weight-reducing cavity 56 may be located in the shank portion 46 and may not be located in the cutting portion 38. Restated, an entirety of the weight-reducing cavity 56 is located in the shank portion 46, rearward of the cutting portion 38.

In accordance with some embodiments of the subject matter of the present application, the cavity chamber 58 may not open out to the holder rearward surface 30. That is to say, the cavity chamber 58 can terminate before the holder rearward end surface 30 in the rearward direction $D_R$. Stated differently, the cavity chamber 58 can be spaced apart from the holder rearward surface 30.

Reference is made in particular to FIG. 6a. The cavity chamber 58 includes a chamber interior wall surface 60. The cavity chamber 58 can be defined by the chamber interior wall surface 60. Generally speaking, the chamber interior wall surface 60 faces inwardly (i.e., towards the chamber central axis F). In accordance with some embodiments of the subject matter of the present application, the chamber interior wall surface 60 can includes two opposite chamber end surfaces 62 and a chamber peripheral surface 64 which extends between the two opposite chamber end surfaces 62. One or both of the two chamber end surfaces 62 can slope inwardly towards the chamber central axis F (e.g., have a conical shape) with respect to a print direction (where typically, the print direction is parallel to the holder longitudinal axis B). This makes printing easier, compared to when the chamber end surfaces 62 are planar and perpendicular to the print direction (which would require support structures). The chamber peripheral surface 64 can extend about the chamber central axis F. That is to say, the chamber peripheral surface 64 can delimit the cavity chamber 58 in a radial direction (i.e., with respect to the chamber central axis F). The chamber peripheral surface 64 can be cylindrical about the chamber central axis F. The cylindrical chamber peripheral surface 64 has a chamber diameter DC. Referring to FIG. 7, the chamber diameter DC can be greater than a quarter the shank diameter DS and less than three quarters the shank diameter DS. The chamber diameter DC can be equal to half the shank diameter DS.

The weight-reducing cavity 56 includes a plurality of cavity through recesses 66. Each cavity through recess 66 extends along a recess central axis C. Advantageously, the plurality of cavity through recesses 66 further reduce the weight of the insert holder 22. Moreover, the plurality of cavity through recesses 66 provide a route for unprinted powder to exit the cavity chamber 58. In accordance with some embodiments of the subject matter of the present application, each of the cavity through recesses 66 can include a recess interior wall surface 68 which extends about the recess central axis C.

Reference is made to FIG. 7. The plurality of cavity through recesses 66 open out to the chamber interior wall surface 60 to form a plurality of inner recess openings 70. In accordance with some embodiments of the subject matter of the present application, the plurality of cavity through recesses 66 can open out to the cylindrical chamber peripheral surface 64 to form the plurality of inner recess openings 70. Stated differently, the plurality of inner recess openings 70 can be located at the cylindrical chamber peripheral surface 64.

The plurality of cavity through recesses 66 open out to the shank radial centering surface 48 to form a plurality of outer recess openings 72. Stated differently, the plurality of outer recess openings 72 can be located at the shank radial centering surface 48. As seen in FIG. 5a, the plurality of outer recess openings 72 (and preferably the entire plurality of cavity through recesses 66) can be located within an axial dimension of the shank flat surface 50).

In accordance with some embodiments of the subject matter of the present application, the recess central axis C can extend perpendicular to the holder longitudinal axis B.

The recess central axis C can extend in a radial direction (i.e., with respect to the holder longitudinal axis B). Moreover, in a cross-section taken in a radial plane perpendicular to the holder longitudinal axis B and intersecting the plurality of cavity through recesses 66 (i.e., FIG. 7), each cavity through recess 66 can extend linearly along the recess central axis C.

Reference is now reverted to FIG. 5a. In accordance with some embodiments of the subject matter of the present application, each cavity through recess 66 may be non-cylindrical. Each cavity through recess 66 can include two opposite through recess ends 74. The two through recess ends 74 can be located between a respective inner recess opening 70 and a respective outer recess opening 72 along the recess interior wall surface 68. The two through recess ends 74 can be opposite each other, in a view along the recess central axis C. Each cavity through recess 66 can include an elongated through recess middle portion 76 which extends lengthwise between the two opposite through recess ends 74 in a direction along the holder longitudinal axis (B). Thus, each cavity through recess 66 can be elongated and form a through groove. The through groove can have a slit-like configuration. Such an elongated cavity through recess 66 can have corresponding elongated inner and outer recess openings 70, 72.

In accordance with some embodiments of the subject matter of the present application, for any given one of the plurality of cavity through recesses 66, one of the two through recess ends 74 can be closer to the cutting portion 38 than the other one of the two through recess ends 74. Thus, as seen in FIG. 5a, the two through recess ends 74 may be axially spaced apart from one another along the holder longitudinal axis B and include an axially forward through recess end 74f and an axially rearward recess end 74r. Furthermore, since in some embodiments, the corresponding through recess middle portion 76 may follow a helical path, the two through recess ends 74f, 74r may be circumferentially spaced apart from one another, as well.

In accordance with some embodiments of the subject matter of the present application, the plurality of cavity through recesses 66 can be angularly spaced apart about the holder longitudinal axis B (preferably evenly). Preferably, the plurality of cavity through recesses 66 can include N cavity through recesses 66, where N is a positive integer satisfying the condition, $5 \leq N \leq 9$. In this non-limiting example shown in the drawings, N equals 7.

In accordance with some embodiments of the subject matter of the present application, the plurality of cavity through recess 66 can extend helically about the holder longitudinal axis B. Each helically-extending cavity through recess 66 has a recess helix angle θ. The recess helix angle θ can be greater than or equal to 20° and less than or equal to 40°. Preferably, the recess helix angle θ can be greater than or equal to 25° and less than or equal to 35°. Preferably still, the recess helix angle θ can be equal to 30°. Reverting to FIG. 4, the plurality of helical flutes 44 can extend helically in the same sense as the plurality of helically-extending cavity through recess 66.

In accordance with some embodiments of the subject matter of the present application, the insert holder 22 can include a plurality of shank support members 78. The plurality of cavity through recesses 66 can be angularly spaced by the plurality of shank support members 78. Each circumferentially adjacent pair of cavity through recesses 66 can be spaced apart by a respective shank support member 78. Thus, in a circumferential direction of the shank radial centering surface 48, the plurality of cavity through recesses 66 can be separated from on another by shank support members 78. Generally speaking, the plurality of shank support members 78 and the plurality of cavity through recesses 66 can alternate with each other along the shank radial centering surface 48 about the holder longitudinal axis B. The number of support members 78 can match the number of cavity through recesses 66 (or be one less if a shank flat surface as described hereinafter is present). The plurality of support members 78 provide sufficient strength and rigidity to the insert holder 22 for the performing metal cutting operations. It is noted that the plurality of shank support members 78 are radially outwardly delimited by the shank radial centering surface 48.

Reference is made to FIGS. 5a and 5b. In accordance with some embodiments of the subject matter of the present application, the plurality of shank support members 78 can be elongated, having a rib-like configuration. The shank radial centering surface 48 at each shank support member 78 can be wider than each outer recess openings 72 in a circumferential direction (about the holder longitudinal axis B). In a cross-section taken in a radial plane perpendicular to the holder longitudinal axis B and intersecting the plurality of shank support members 78 (i.e., FIG. 7), each of the plurality of shank support members 78 can have an annular sector basic shape. That is to say, the basic shape can be that of a sector of an annulus. The basic shape is formed from two opposite wedge (i.e., converging) perimeter edges and two opposite curved perimeter edges. The inner and outer circles of the annulus may not be concentric with the shank radial centering surface 48 and the chamber peripheral surface 64. The corners of the sector of the annulus can be curved. Also in such a view, circumferentially adjacent pairs of shank support members 78 can be spaced apart by a constant recess distance d. The recess distance d can satisfy the condition, 1 mm≤d≤4 mm. It is noted that the recess distance d is equivalent to the width of the cavity through recess 66 as measured in a tangential direction. Further still in such a view, each shank support member 78 can have an angular extent about the holder longitudinal axis B (at the shank radial centering surface 48) defining a shank support member angle α. The shank support member angle α can depend on the cavity through recesses N and the recess distance d. In this non-limiting example shown in the drawings, the shank support member angle α can be greater than 30° and less than 50°. It is noted that in the configuration with helically-extending cavity through recesses 66, the plurality of shank support members 78 can also extend helically about the holder longitudinal axis B.

As seen best in FIG. 5b, in accordance with some embodiments of the subject matter of the present application, the shank flat surface 50 can intersect a projected path P of at least one of the plurality of cavity through recesses 66, so that at least one of the plurality of cavity through recesses 66 is truncated (i.e., have a shortened length with respect to the other cavity through recesses 66). Stated differently, the plurality of cavity through recesses 66 can include at least one truncated cavity through recess 66a. The projected path P may be helical about the shank portion 46. In certain configurations, the plurality of cavity through recesses 66 can include a plurality of truncated cavity through recesses 66a. In this non-limiting example shown in the drawings, the shank flat surface 50 intersects exactly four cavity through recesses 66, two on either side of the shank flat surface 50 (i.e., there are exactly four truncated cavity through recess 66a).

For each cavity through recess 66 that is not shortened (i.e., not a truncated cavity through recesses 66a), one of the two through recess ends 74 can be closer to the cutting portion 38 than to the holder rearward end surface 30. The other one of the two through recess ends 74 can be closer to the holder rearward end surface 30 than to the cutting portion 38. It is noted that the plurality of outer recess openings 72 may not be located on the shank flat surface 50. Moreover, the shank portion 46 radially inward from the shank flat surface 50 may be devoid of any cavity through recess 66, though means for conveying cooling fluid (e.g., a cooling channel 66) may be present. Advantageously this improves the strength and rigidity of the insert holder 22. It is also noted that by virtue of the cavity through recesses 66 being truncated, an adjacent shank support member 78 can also be truncated.

In accordance with some embodiments of the subject matter of the present application, the insert holder 22, includes a flat support member 78*b*. The flat support member 78*b* may not have a rib-like configuration. The flat support member 78*b* is angularly located (about the holder longitudinal axis B) between two cavity through recesses 66 and incorporates a portion of the shank flat surface 50. It is noted that the plurality of shank support members 78 may not incorporate the shank flat surface 50. The plurality of cavity through recesses 66 can include a plurality of truncated cavity through recess 66*a*. The flat support member 78*b* can be located between two truncated cavity through recess 66*a*.

Along the cavity chamber length L of the cavity chamber 58, the plurality of through recesses 66 take up between 10% to 40% of the surface area of the shank radial centering surface 48. Accordingly, along the cavity chamber length L of the cavity chamber 58, the shank support members 78 take up well over one-half the surface area of the shank radial centering surface 48, to help ensure the rigidity of the shank portion 46. Removing this percentage of material provides meaningful weight reduction (and savings in material) in the insert holder 22 while not compromising its rigidity. Also, with respect to the above percentage range, it is understood that the shank flat surface 50, when present, is not considered part of the shank radial centering surface 48.

Figure 11:
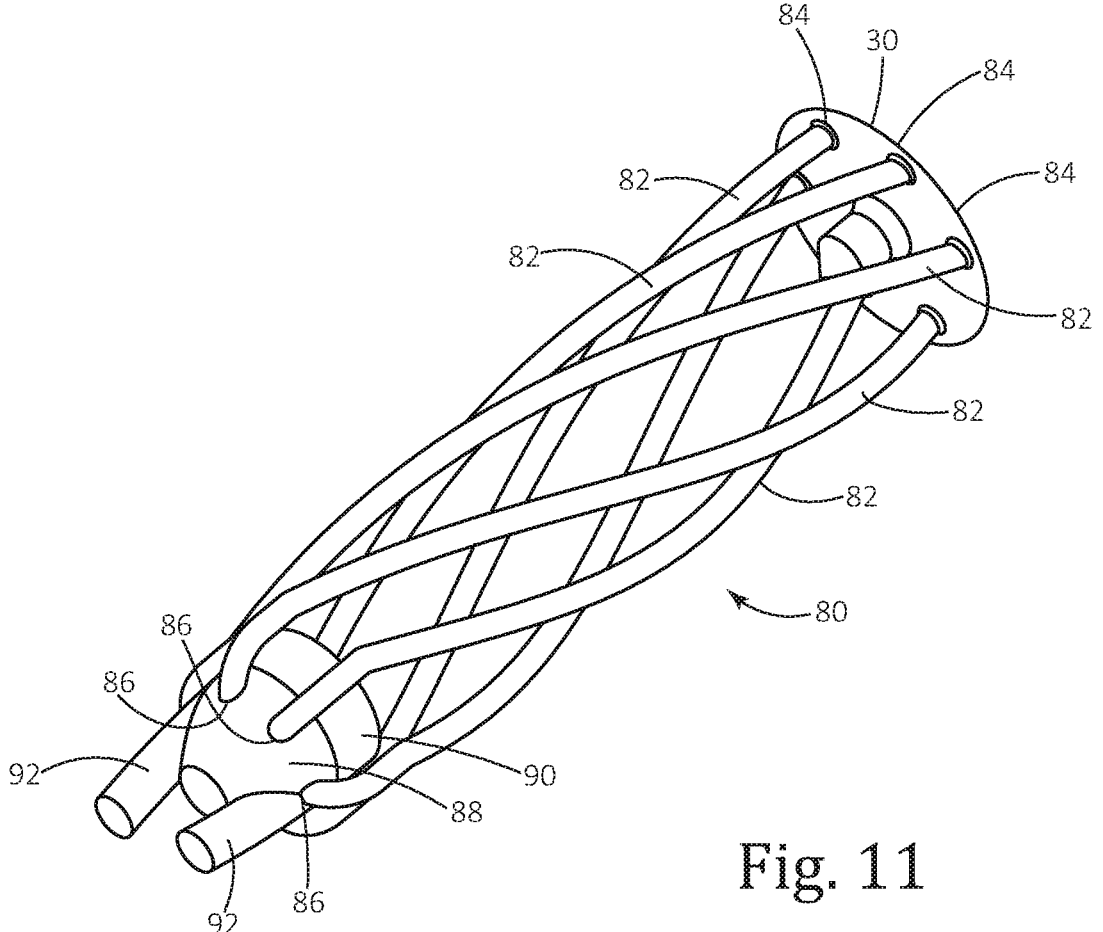
FIG. 11 is an analogous detail of FIG. 10, showing the hidden cooling conduit.

Referring to FIG. 11, in accordance with some embodiments of the subject matter of the present application, the insert holder 22 can include a cooling conduit 80. The cooling conduit 80 serves to provide cooling fluid to the cutting region. The cooling conduit 80 can include a plurality of cooling channels 82. Each cooling channel 82 has a channel inlet 84 and a channel outlet 86 which are in fluid communication with each other. Each channel inlet 84 can be located at the holder rearward end surface 30 or the holder peripheral surface 36 at the shank portion 46. Preferably, each channel inlet 84 can be located at the holder rearward end surface 30. Reverting to FIG. 7, each cooling channel 82 can pass through a respective shank support member 78. That is to say, each cooling channel 82 can be enclosed at least partially in a respective shank support member 78. It is noted that the entire cooling conduit 80 (including the plurality of cooling channels 82) can be spaced apart from the weight-reducing cavity 56.

The cooling conduit 80 can include a cooling reservoir 88. As seen in FIG. 6*a*, the cooling reservoir 88 can be enclosed in the insert holder 22 forward of the cavity chamber 58. The cooling reservoir can include a reservoir interior wall surface 90. Each channel outlet 86 can be located at the reservoir interior wall surface 90. From the cooling reservoir 88 coolant can reach the cutting region via cooling exit channels 92.

Another aspect of the present invention relates to a tool assembly. The tool assembly includes a tool holder having a tool forward surface. The tool holder includes a tool receiving recess recessed in the tool forward surface. The tool receiving recess includes a recess abutment surface. In accordance with some embodiments of the subject matter of the present application, the shank portion 46 can be located in the tool receiving recess and releasably clamped therein. The shank radial centering surface 48 can abut the recess abutment surface. The shank axial abutment surface 54 can abut the tool forward surface.

Although the subject matter of the present application has been described to a certain degree of particularity, it should be understood that various alterations and modifications could be made without departing from the spirit or scope of the invention as hereinafter claimed.

For example, if the recess helix angle θ is great enough, the shank flat surface 50 can intersect the projected path P of at least one of the plurality of cavity through recesses 66, so that said at least one of the plurality of cavity through recesses 66 is interrupted. It is noted that an "interrupted" cavity through recess 66 is one that extends non-continuously between its two through recess ends 74. That is to say, such a cavity through recess 66 is formed from two or more sub-recesses which lie on the same projected path P.

What is claimed is:

1. An insert holder (22), elongated along a holder longitudinal axis (B) thereof, the holder longitudinal axis (B) defining opposite forward and rearward directions (DF, DR), the insert holder (22) having monolithic construction and comprising:

a holder forward end surface (28), a holder rearward end surface (30) and a holder peripheral surface (36) extending therebetween, the holder peripheral surface (36) extending about the holder longitudinal axis (B);

a cutting portion (38) comprising an insert pocket (42), for releasably retaining a cutting insert (24), the cutting portion (38) located at a forward end (32) of the insert holder (22);

a shank portion (46) extending rearwardly from a shank axial abutment surface (54) at a rearward end of the cutting portion (38), the shank axial abutment surface (54) perpendicular to the holder longitudinal axis (B), the holder peripheral surface (36) at the shank portion (46) comprising a shank radial centering surface (48), the entire shank portion (46) configured to be located in a tool receiving recess of a tool holder, the shank portion (46) releasably clamped therein with the shank radial centering surface (48) abutting a recess abutment surface of the tool receiving recess; and a weight-reducing cavity (56) comprising:

a cavity chamber (58) enclosed within the insert holder (22), the cavity chamber (58) comprising a chamber interior wall surface (60); and a plurality of cavity through recesses (66) opening out to: (i) the chamber interior wall surface (60) thereby forming a plurality of inner recess openings (70), and to (ii) the shank radial centering surface (48) thereby forming a plurality of outer recess openings (72); wherein:

an entirety of the weight-reducing cavity (56) is located in the shank portion (46), rearward of the cutting portion (38), the plurality of cavity through recesses (66) extending helically about the holder longitudinal axis (B) along a respective through recess longitudinal axis defined by each cavity through recess (66), the cutting portion (38) comprises a plurality of flutes (44) recessed in the holder peripheral surface (36), and the plurality of flutes (44) extend helically about the holder longitudinal axis (B) in the same helical direction as the plurality of helically-extending cavity through recesses (66).

2. The insert holder (22), according to claim 1, wherein the cavity chamber (58) is spaced apart from the holder rearward surface (30).

3. The insert holder (22), according to claim 1, wherein: each cavity through recess (66) comprises:
a recess interior wall surface (68) extending about a recess central axis (C);
two opposite through recess ends (74) located between a respective inner recess opening (70) and a respective outer recess opening (72); and
an elongated through recess middle portion (76) extending lengthwise between the two opposite through recess ends (74), so that each cavity through recess (66) is elongated in a direction along the holder longitudinal axis (B).

4. The insert holder (22), according to claim 3, wherein, for any given one of the plurality of cavity through recesses (66), one of the two through recess ends (74) is closer to the cutting portion (38) than the other one of the two through recess ends (74).

5. The insert holder (22), according to claim 1, wherein the shank radial centering surface (48) is cylindrical or conical about the holder longitudinal axis (B).

6. The insert holder (22), according to claim 5, wherein: the shank radial centering surface (48) is cylindrical about the holder longitudinal axis (B), and
the cylindrical shank radial centering surface (48) has a shank diameter (DS).

7. The insert holder (22), according to claim 6, wherein: the chamber interior wall surface (60) comprises two opposite chamber end surfaces (62) and a chamber peripheral surface (64) extending between the chamber end surfaces (62), about a chamber central axis (F);
the chamber peripheral surface (64) is cylindrical about the chamber central axis (F), the cylindrical chamber peripheral surface (64) having a chamber diameter (DC); and
the chamber diameter (DC) is greater than a quarter the shank diameter (DS) and less than three quarters the shank diameter (DS).

8. The insert holder (22), according to claim 7, wherein the chamber diameter (DC) is equal to half the shank diameter (DS).

9. The insert holder (22), according to claim 1, wherein the plurality of cavity through recesses (66) comprises N cavity through recesses (66), N being a positive integer satisfying the condition, 5≤N≤9.

10. The insert holder (22), according to claim 9, wherein N=7.

11. The insert holder (22), according to claim 1, wherein the plurality of cavity through recesses (66) are angularly spaced apart about the holder longitudinal axis (B).

12. The insert holder (22), according to claim 11, wherein the plurality of cavity through recesses (66) are angularly spaced by a plurality of shank support members (78), each circumferentially adjacent pair of cavity through recesses (66) being spaced apart by a respective shank support member (78).

13. The insert holder (22), according to claim 12, wherein the shank radial centering surface (48) at each shank support member (78) is wider than each outer recess opening (72) in a circumferential direction.

14. The insert holder (22), according to claim 12, wherein in a cross-section taken in a radial plane perpendicular to the holder longitudinal axis (B) and intersecting the plurality of shank support members (78), each of the plurality of shank support members (78) has an annular sector shape.

15. The insert holder (22), according to claim 12, wherein the holder peripheral surface (36) at the shank portion (46) comprises a shank flat surface (50) which is oriented parallel to the holder longitudinal axis (B) and intersects the shank radial centering surface (48), the shank flat surface (50) having monolithic construction with the remainder of the insert holder (22).

16. The insert holder (22), according to claim 15, wherein the shank flat surface (50) intersects a projected path (P) of at least one of the plurality of cavity through recesses (66), so that the plurality of cavity through recesses (66) comprises at least one truncated cavity through recess (66a).

17. The insert holder (22), according to claim 16, wherein for each cavity through recess (66) that is not a truncated cavity through recess (66a), one of the two through recess ends (74) is closer to the cutting portion (38) than to the holder rearward end surface (30) and the other one of the two through recess ends (74) is closer to the holder rearward end surface (30) than to the cutting portion (38).

18. The insert holder (22), according to claim 16, comprising a flat support member (78b), the flat support member (78b) being angularly located between two cavity through recesses (66) and incorporating a portion of the shank flat surface (50).

19. The insert holder (22), according to claim 18, wherein:
the plurality of cavity through recesses (66) comprises a plurality of truncated cavity through recess (66a); and
the flat support member (78b) is located between two truncated cavity through recess (66a).

20. The insert holder (22), according to claim 11, wherein:
the insert holder (22) comprises a cooling conduit (80), the cooling conduit (80) comprising a plurality of cooling channels (82), each cooling channel (82) having a channel inlet (84) and a channel outlet (86) which are in fluid communication with each other; and
each cooling channel (82) passes through a respective shank support member (78).

21. The insert holder (22), according to claim 20, wherein:
the cooling conduit (80) comprises a cooling reservoir (88) comprising a reservoir interior wall surface (90), the cooling reservoir (88) being enclosed in the insert holder (22) forward of the cavity chamber (58); and
each channel outlet (86) is located at the reservoir interior wall surface (90).

22. The insert holder (22), according to claim 1, wherein each helically-extending cavity through recess (66) has a recess helix angle (θ), the recess helix angle (θ) being greater than or equal to 20° and less than or equal to 40°.

23. The insert holder (22), according to claim 1, wherein:
the holder peripheral surface (36) comprises a holder intermediate surface (52) oriented transversely to the holder longitudinal axis (B);
the holder intermediate surface (52) is contained in a delimiting plane (D) which is oriented perpendicular to the holder longitudinal axis (B) and delimits the cutting portion (38) and the shank portion (46); and
in the forward direction (DF), the cavity chamber (58) terminates before the delimiting plane (D).

24. The insert holder (22), according to claim 1, wherein:

the cutting portion (38) has a cutting portion length (LC) and the shank portion (46) has a shank portion length (LS), both measured in a direction parallel to the holder longitudinal axis (B); and the shank portion length (LS) is greater than the cutting portion length (LC).

25. The insert holder (22), according to claim 24, wherein:

the cavity chamber (58) has a cavity chamber length (L), measured in said direction parallel to the holder longitudinal axis (B); and the cavity chamber length (L) is greater than half the shank portion length (LS).

26. The insert holder (22), according to claim 1, wherein:

the chamber interior wall surface (60) comprises two opposite chamber end surfaces (62) and a chamber peripheral surface (64) extending therebetween about a chamber central axis (F); and the chamber peripheral surface (64) is cylindrical about the chamber central axis (F), the cylindrical chamber peripheral surface (64) having a chamber diameter (DC).

27. The insert holder (22), according to claim 26 wherein the plurality of inner recess openings (70) are located at the cylindrical chamber peripheral surface (64).

28. The insert holder (22), according to claim 1, wherein in a cross-section taken in a radial plane perpendicular to the holder longitudinal axis (B) and intersecting the plurality of cavity through recesses (66), each cavity through recess (66) extends linearly along a recess central axis (C).

29. The insert holder (22) according to claim 1, wherein:

the cavity chamber (58) has a cavity chamber length (L); and along the cavity chamber length (L) of the cavity chamber (58), the plurality of cavity through recesses (66) take up between 10%-40% of the surface area of the shank radial centering surface (48).

30. The insert holder (22), according to claim 26, wherein at least one of the two chamber end surfaces (62) slopes inwardly towards the chamber central axis (F) and has a conical shape.

31. The insert holder (22), according to claim 30, wherein both chamber end surfaces (62) slope inwardly towards the chamber central axis (F) and have a conical shape.

32. The insert holder (22), according to claim 1, wherein the shank portion (46) terminates at and extends rearwardly from the shank axial abutment surface (54).

\*    \*    \*    \*    \*